United States Patent [19]

Acosta

[11] Patent Number: 4,981,317
[45] Date of Patent: Jan. 1, 1991

[54] APPARATUS FOR COVERING CONTAINER ON VEHICLE

[75] Inventor: Evelio Acosta, Hialeah, Fla.
[73] Assignee: Hesco Sales, Inc., Hialeah, Fla.
[21] Appl. No.: 24,915
[22] Filed: Mar. 10, 1987

Related U.S. Application Data

[63] Continuation of Ser. No. 701,959, Feb. 15, 1985, abandoned.
[51] Int. Cl.⁵ .............................................. B60J 11/00
[52] U.S. Cl. .................................. 296/98; 242/75.53; 160/72
[58] Field of Search ................................. 296/98, 100; 160/66–68, 72; 242/75.53

[56] References Cited

U.S. PATENT DOCUMENTS

| | | | |
|---|---|---|---|
| 2,984,431 | 5/1961 | North | 242/75.53 |
| 3,086,811 | 4/1963 | Hartviksen | 296/98 |
| 3,460,776 | 8/1969 | Stiegler et al. | 242/75.53 |
| 3,549,197 | 12/1970 | Sibley | 296/100 |
| 3,549,198 | 12/1970 | Cappello | 296/100 |
| 3,558,074 | 1/1971 | Held | 242/75.53 |
| 3,788,575 | 1/1974 | Boettcher | 242/75.53 |
| 3,868,142 | 2/1975 | Bachand et al. | 296/98 |

*Primary Examiner*—Dennis H. Pedder
*Attorney, Agent, or Firm*—Wood, Phillips, Mason, Recktenwald & VanSanten

[57] ABSTRACT

An apparatus for covering the open top of a container positioned on a vehicle for transportation includes a fluid actuated motor for a spool on which a flexible cover is wound, and a pair of fluid actuated cylinders to pivot a pair of elongated arms that convey the cover away from the spool. The motor is arranged to drive the spool to release the cover slightly slower than the arms are pivoted, so that the arms are not subjected to a large counter force. In addition, the spool is mounted for vertical movement so that containers having different heights may be properly closed.

6 Claims, 2 Drawing Sheets

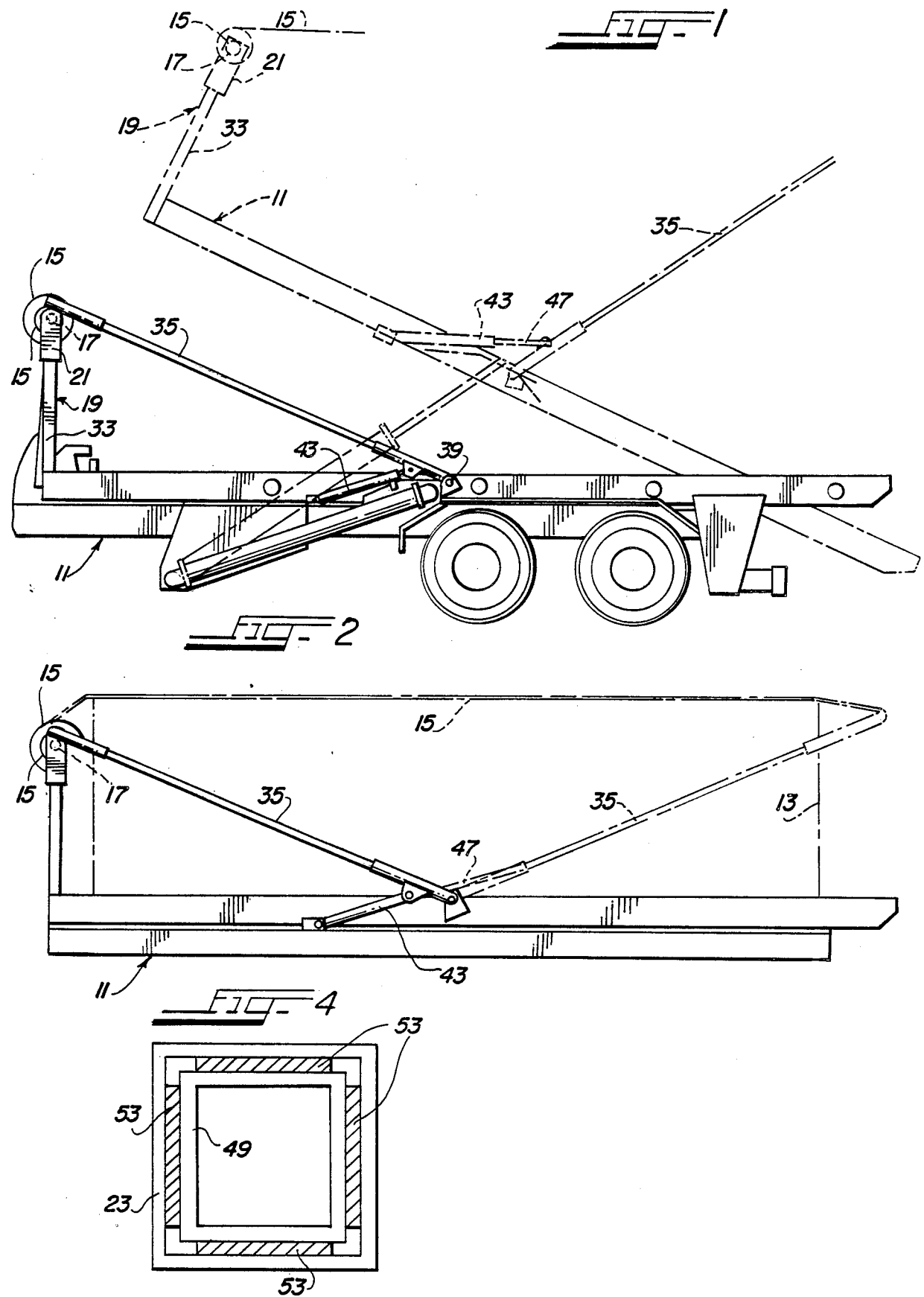

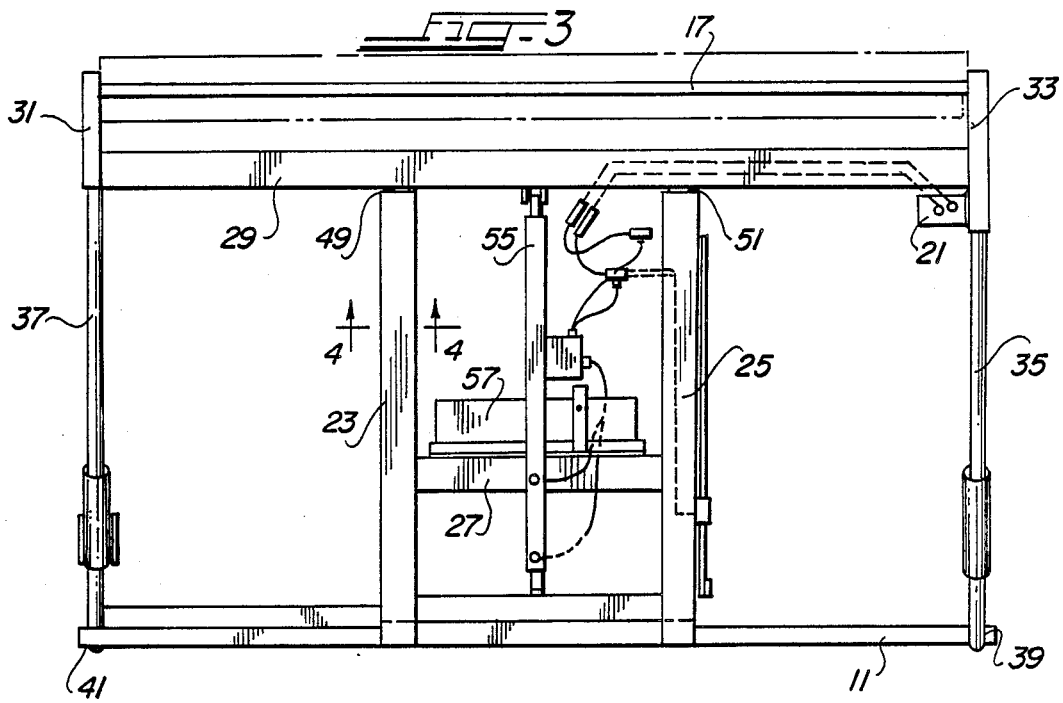
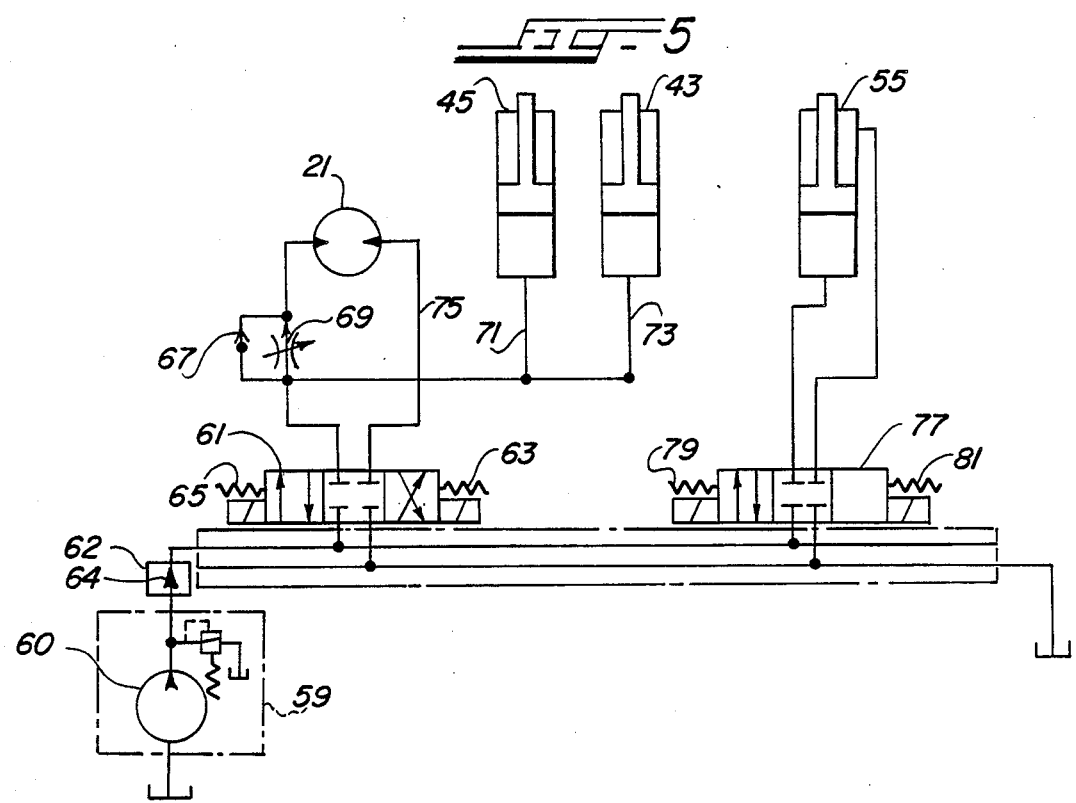

APPARATUS FOR COVERING CONTAINER ON VEHICLE

This is a continuation of application Ser. No. 06/701,959, filed Feb. 15, 1985, abandoned.

BACKGROUND OF THE INVENTION

1. Field of the Invention

This invention relates generally to an apparatus for covering an open container on a vehicle to prevent loss of the contents while the vehicle is moving, and more specifically, this invention relates to an hydraulically actuated arrangement for covering large garbage containers that are placed on the beds of appropriate transporting trucks.

2. Description of the Prior Art

Large open containers for various substances, such as garbage, waste, sand and chips, are placed on vehicles, such as large trucks, for transporting. During the transportation of these open containers, it is desirable to cover the open top of the container so that the material therein will not be blown or bounced out.

Various methods have been used in the past to cover such large open containers, including the hand fastening of a tarpaulin over the top of the container. More mechanized approaches have included hand-actuated cranks and various electrically, pneumatically and hydraulically actuated systems. While some of these approaches have been quite useful for covering open top vehicles, such as dump trucks, there have been a number of disadvantages and problems.

One common type of approach has been to utilize a pair of pivoted elongated arms to carry the cover over the opening to be closed. Various types of drive mechanisms have been utilized for these arms, and in most cases the cover is pulled off a spool or roller on which it has been wound. In order to rewind the cover, a suitable force, usually provided by a large return spring, has been utilized. This means that the driving mechanism must overcome the force of the return spring, which requires a greater source of power. In addition, the force exerted on the pivoted arms could bend or distort the arms, unless they are made sufficiently strong. Arms made sufficiently strong are heavier, which requires another increase in the power of the driving mechanism.

Another factor is that most cover arrangements are utilized for a fixed structure, such as the bed of a dump truck. However, when the cover is to be utilized with a transportable container, the containers may be of different heights. With a fixed height for the cover support, it means that some containers will not be adequately closed by the cover.

Accordingly, it would be desirable to provide a covering apparatus for containers on transporting vehicles which can be non-manually actuated to close open top containers having a variety of different heights. In addition, the apparatus should be relatively light weight and require as little actuating power as possible.

SUMMARY OF THE INVENTION

The present invention provides advantages over the prior art by utilizing a fluid actuated apparatus, such as an hydraulically operated system, in which a pair of relatively light-weight, pivoted extending arms are attached to one end of a flexible cover, such as a tarpaulin. This cover must be at least as large as the open top of the container to be covered. The cover is rolled on a spool for storage, the spool being mounted on a frame that is supported by the vehicle.

A fluid actuated motor, such as an hydraulic motor, is utilized to rotate the spool. This motor is also mounted on the frame and is adapted to rotate the spool in both directions, whichever direction is required.

A pair of fluid actuated cylinders are mounted on the vehicle, each of the cylinders being attached to an associated one of the supporting arms to drive that arm about its pivot point. These fluid actuated cylinders are also preferably hydraulically actuated.

When a container is to be covered, the motor is actuated to begin unrolling the cover on the spool. At the same time, the cylinders are actuated to begin pivoting the arms to move the cover in an arcuate path over the container. The motor is arranged to unroll the cover slightly slower than the cylinders pivot the arms, so that the cover remains relatively taut, but does not exert a strong counter force against the arms. When it is desired to rewind the cover on the spool, the motor is actuated to rotate the spool in the opposite direction, and the hydraulic power supplied to the cylinders is removed. The residual force in the cylinders as the actuating fluid is forced out provides a sufficient force against the cover to maintain it relatively taut as it is wound on the spool. A suitable drive control is provided to determine the time and mode of energization of the fluid actuated members.

In order to permit covering of containers having a variety of different heights, the spool is mounted on a portion of the frame that is vertically movable with respect to the rest of the frame. In the preferred embodiment disclosed herein, this vertically movable portion is a pair of generally rectangular support tubes that telescopically fit within larger, generally stationary tubes. Suitable spacers are provided to prevent distortion or binding between the telescoped tubes. Another fluid actuated cylinder is provided to adjust the height of the spool to coincide with the height of the container to be covered.

By using the fluid actuated motor to unwind the cover from the spool, it means that the elongated arms do not need to overcome a relatively large return force, nor do the fluid actuated cylinders have to drive the arms against such a force. Accordingly, relatively light actuating arms and relatively low power actuating cylinders can be utilized, with the attendant savings. Further, by having the adjustable support for the spool, the cover may be utilized to provide a good closure for containers having a variety of different heights.

These and other objects, advantages and features of this invention will hereinafter appear, and for purpose of illustration, but not of limitation, an exemplary embodiment of the subject invention is shown in the appended drawing.

BRIEF DESCRIPTION OF THE DRAWING

FIG. 1 is a side elevational view of a portion of a vehicle on which is mounted a covering apparatus constructed in accordance with the present invention, showing in phantom lines a different position of the vehicle bed and the cover support arms.

FIG. 2 is a fragmentary side elevational view similar to FIG. 1 showing the cover in position over a container.

FIG. 3 is an enlarged front elevational view of the apparatus of FIG. 1.

FIG. 4 is an enlarged cross-sectional view taken along line 4—4 of FIG. 3.

FIG. 5 is a schematic diagram of the hydraulic control system for the apparatus of FIG. 1.

DETAILED DESCRIPTION OF THE PREFERRED EMBODIMENT

With respect to FIG. 1, a vehicle 11 for transporting a container 13 (FIG. 2) is illustrated. In this particular embodiment, the vehicle is a large truck of which only a portion of the frame and bed on which the container would be placed is shown.

A flexible cover 15, such as a tarpaulin, is wound or rolled on a spool 17 that is mounted on a frame 19 supported by the vehicle 11. A fluid actuated motor 21, such an hydraulic motor, is also mounted on the frame 19. As best seen in FIG. 3, frame 19 includes a pair of supporting members 23 and 25, with a cross support member 27. Frame 19 also includes the cross piece 29 bearing the end pieces 31 and 33, between which the spool 17 is rotatably mounted. Motor 21 is also mounted on the end piece 33.

One end of the cover 15 has each side thereof attached to an elongated pivoted support arm 35 or 37. Arms 35 and 37 are pivotably supported in the truck 11 at points 39 and 41.

Pivoted elongated arms 35 and 37 are driven by fluid actuated cylinders 43 and 45, respectively. (Cylinder 45 is not expressly shown, except in the hydraulic circuit diagram of FIG. 5, but it is substantially identical to cylinder 43 in structure.) Fluid actuated cylinders 43 and 45 are, in this preferred embodiment, hydraulic cylinders.

When it is desired to close a container 13 with the cover 15, motor 21 is actuated to begin rotating spool 17 to cause cover 15 to be unwound. At the same time, cylinders 43 and 45 are actuated to start pivoting arms 35 and 37 to pull the cover 15 over container 13 in an arcuate path. Motor 21 is arranged to unroll cover 15 slightly slower than cylinders 43 and 45 pivot arms 35 and 37, so that arms 35 and 37 are not exposed to a large counter force. As shown in the phantom lines in FIG. 1, actuation of the cylinders 43 and 45 cause their pistons to extend (piston 47 of cylinder 43) to pivot the arms 35 and 37. After the cover 15 has been transported through its arcuate path, it is brought down to close the open top of container 13 as illustrated in FIG. 2.

To remove the cover from container 13, motor 21 is energized to rotate spool 17 in the opposite direction to rewind cover 15 on spool 17. Cylinders 43 and 45 are deactivated, but since these cylinders are provided with a single hydraulic supply line, the actuating fluid is forced back to the reservoir as arms 35 and 37 are pivoted through the force exerted by cover 15 as a result of the motor 21 rolling the cover on spool 17. The forcing out of the actuating fluid produces enough of a drag or counter force to keep the cover relatively taut.

In FIG. 3, it may be seen that the cross piece 29 is actually mounted on supports 49 and 51, which extend from the supports 23 and 25. Supports 49 and 51 are vertically movable supports that telescope into the stationary supports 23 and 25 to permit spool 17 to be raised and lowered.

As best shown in FIG. 4, the support 49 is a tube having a generally rectangular cross section, in this case square, that fits within the stationary tube 23, which also has a generally rectangular cross section. Spacer plates 53 are located between the tubes 23 and 49 to keep the tubes separated and positioned properly to prevent any distortion or binding during movement.

A fluid actuated cylinder 55 is utilized to drive cross piece 29 and side pieces 31 and 33, and hence spool 17, to a desired vertical position. This desired vertical position will be one which permits the cover 15 to properly cover the container 13, since different containers 13 will frequently have different heights.

A reservoir and drive mechanism 57 for the motor 21 is located on cross support member 27 of frame 19.

The schematic diagram of FIG. 5 illustrates the hydraulic system in a simplified fashion. A starter motor and hydraulic reservoir 59 are provided for the system.

Starter motor 60 drives a conventional hydraulic pump 62, in which is located a known type of pressure relief valve 64. If one of the arms 35 and 37 is blocked in its forward travel under actuation of cylinders 43 and 45, a back pressure will develop that causes pressure relief valve 64 to pass hydraulic fluid back to the reservoir and deactivate said cylinders 43 and 45 to prevent damage to arms 35 and 37.

The flow of hydraulic power to motor 21 and cylinders 43 and 45 is controlled by a solenoid block 6 having a pair of solenoid coils 63 and 65. When power is being supplied to motor 21 to unroll cover 15 from spool 17, a check valve 67 blocks the fluid flow so that it must pass through the flow valve 69. Flow valve 69 will control the speed of motor 21 with respect to the speed at which cylinders 43 and 45 are energized through lines 71 and 73 to pivot the arms 35 and 37.

When motor 21 is to be energized to rewind the cover on spool 17 the full power of the hydraulic fluid is conveyed to motor 21 through line 75.

Cylinder 55 is similarly controlled through a solenoid block 77 that has solenoid coils 79 and 81.

It should be understood that various modifications, changes and variations may be made in the arrangement, operation and details of construction of the elements disclosed herein without departing from the spirit and scope of this invention.

I claim:

1. Apparatus for covering an open-topped container from which loose materials can escape during transport on a vehicle and comprising:

a flexible cover having a size at least as large as the open top of the container;

a rotatable spool on which said cover may be rolled;

a fluid actuated motor to drive said spool in both directions of rotation;

a frame located on the vehicle for mounting said spool and said motor adjacent one end of the container when it is positioned on the vehicle;

a pair of elongated support arms, each of said arms having a first end thereof pivotably mounted on a side of the vehicle opposite the pivoted first end of the other arm at a position along the length of the vehicle adjacent the midpoint of said cover when fully extended over the container, the other ends of said arms being attached to opposing sides of one end of said cover;

a pair of single line, fluid-actuated cylinders, each of said cylinders attached between the vehicle and an associated one of said arms to drive said arms to pull said cover in an arcuate path over a container to be covered; and drive control means to cause said motor to rotate said spool at a predetermined fixed speed in order to release said cover at a rate slightly slower than said cylinders would pivot said arms in the absence of a counter force exerted through said cover to prevent said arms from being bent by having to unroll said cover against a return force, said drive control means also causing said motor to rotate said spool in the opposite direction to roll said cover on said spool against the residual force required to drive the actuating fluid from said cylinders.

2. Apparatus as claimed in claim 1 wherein said spool is mounted on a portion of said frame that is vertically movable with respect to the rest of said frame.

3. Apparatus as claimed in claim 2 wherein said movable portion of said frame comprises a pair of support tubes each having a generally rectangular cross-section mounted in, and spaced from, a corresponding pair of stationary tubes each having a generally rectangular cross-section.

4. Apparatus as claimed in claim 2 and further comprising a fluid actuated spool adjusting cylinder to raise and lower said spool for containers having different heights from the bed of the vehicle.

5. Apparatus as claimed in claim 4 wherein said fluid actuated motor and cylinders are hydraulically actuated.

6. Apparatus as claimed in claim 1 and further comprising a pressure relief valve associated with said cylinders to deactivate said cylinders if free travel of said cover is impeded.

* * * * *